United States Patent [19]  [11]  4,419,292
Yamanaka et al.  [45]  Dec. 6, 1983

[54] PROCESS FOR PRODUCING POLYCONDENSATES OF ω-OXYPENTADECANOIC ACID

[75] Inventors: Tohr Yamanaka, Kamakura; Takashi Imai, Hiratsuka, both of Japan

[73] Assignee: Takasago Perfumery Co., Ltd., Tokyo, Japan

[21] Appl. No.: 339,230

[22] Filed: Jan. 13, 1982

[30] Foreign Application Priority Data

Jan. 13, 1981 [JP] Japan .................................. 56-2629

[51] Int. Cl.$^3$ .............................................. C11C 3/02
[52] U.S. Cl. ............................ 260/410.9 R; 260/409; 260/410; 260/413
[58] Field of Search .................... 260/410 R, 410.9 Q, 260/413 Q, 409

[56] References Cited

U.S. PATENT DOCUMENTS

| | | | |
|---|---|---|---|
| 2,727,048 | 12/1955 | Mack et al. | 260/409 |
| 3,036,100 | 5/1962 | Pfeiffer et al. | 260/409 X |
| 3,778,465 | 12/1973 | Barnstorf | 260/409 |
| 4,244,873 | 1/1981 | Suzuki et al. | 260/409 X |

OTHER PUBLICATIONS

Mack et al., J. Organic Chemistry, vol. 18, No. 6, pp. 686–692, (1953).

*Primary Examiner*—Helen M. S. Sneed
*Attorney, Agent, or Firm*—Sughrue, Mion, Zinn, Macpeak and Seas

[57] ABSTRACT

A process is described for producing polycondensates of ω-oxypentadecanoic acid comprising hydrogenolysis of 2-tetrahydrofuran-undecanoic acid or an ester thereof using a mixed catalyst composed of a catalyst for hydrogenation comprising one or more metals of Group VIII of the Periodic Table, copper-chromium, or copper-zinc, and a solid acid catalyst, by heating under pressure with hydrogen.

10 Claims, No Drawings

PROCESS FOR PRODUCING POLYCONDENSATES OF ω-OXYPENTADECANOIC ACID

FIELD OF THE INVENTION

The present invention relates to a process for producing polycondensates of ω-oxypentadecanoic acid.

Namely, the present invention provides a novel process for producing polycondensates of ω-oxypentadecanoic acid, which are intermediates used for producing the cyclopentadecanolide of macrocyclic lactone having 15 carbon atoms as a musk type synthetic perfume useful in the field of perfumery.

BACKGROUND OF THE INVENTION

Hitherto, with respect to macrocyclic lactone, many studies have been done, and about 100 compounds having a musk odor have been reported. However, at the present time, only ten or so compounds have been practically utilizable as perfume components, and cyclopentadecanolide is particularly important as a vegetable-source musk substance. Accordingly, it has been desired in the field of perfumery to provide an excellent process for producing inexpensive cyclopentadecanolide, and a large amount of literature about cyclization for producing this compound or about synthesis of starting materials for cyclization has been published.

Among a number of processes for synthesizing cyclopentadecanolide, one process industrially practiced is a process which comprises polycondensating ω-oxypentadecanoic acid or an ester thereof and depolymerizing it to obtain the cyclopentadecanolide of macrocyclic lactone (*J. Amer. Chem. Soc., Vol.* 58, 654 (1936)). In this process, there is a problem as to how ω-oxypentadecanoic acid, the starting material, can be economically produced.

Hitherto, the ω-oxypentadecanoic acid has been produced by a process comprising many synthetic steps, using natural oils such as rapeseed oil, castor oil, etc. According to this process, however, the yield is poor and the cost is high (*Chem. and Ind.,* (1960), pp. 1334-5).

On the other hand, a process which comprises carrying out teromerization of ethylene to produce ω-oxypentadecanoic acid has been proposed (A. N. Nesmeyanov et al., *Zh. Obshch. Khim.,* Vol. 5, 371 (1960)). However, this process produces various kinds of by-products, thus deteriorating the yield.

Furthermore, a process which comprises introducing a side chain into a cyclic compound such as 2-ethoxycarboxycyclopentanone or thiophene, etc., and carrying out ring-cleavage to produce ω-oxypentadecanoic acid has been reported (U.S. Pat. No. 2,989,566, *Chem. Abstracts,* Vol. 55, 27059f, Sato, *Preprint of Chem. Soc. Japan,* No. 22 (III), p. 1509 (1969)). However, ω-oxypentadecanoic acid obtained by this process is expensive, not only because the above-described low molecular weight cyclic compounds are not suitable as the starting material (because of their expense), but also because expensive $C_{10}$ or $C_{11}$ dibasic acid is necessary in order to introduce the side chain.

Furthermore, a process which comprises carrying out light exposure and catalytic reduction of β-(2-oxocyclododecyl)propionic acid or an ester thereof, as the starting material, derived from cyclododecanone obtained from butadiene, to produce ω-oxypentadecanoic acid or ester thereof has been disclosed in Japanese Patent Publication No. 16930/70. However, in the last decade, a marked rise in the electronic energy cost of the light exposure has suppressed the industrial merit of this process prevailing difficulties in using expensive cyclododecanone under the protection of its carbonyl group by morpholine.

Moreover, a process which comprises carrying out an addition reaction of inexpensive tetrahydrofuran with undecylenoic acid or an ester thereof, obtained by thermal decomposition of castor oil in the presence of peroxide to produce 2-tetrahydrofuran-undecanoic acid or an ester thereof, has been described in Japanese Patent Publication No. 4262/68, wherein a process for deriving ω-oxypentadecanoic acid or ester thereof from 2-tetrahydrofuran-undecanoic acid or ester thereof has been described in the specification. However, the process for deriving ω-oxypentadecanoic acid or an ester thereof from 2-tetrahydrofuran-undecanoic acid or an ester thereof is a known process (refer to G. A. Olah, *Friedel-Crafts and Related Reaction,* Vol. IV, p. 17). Namely, this process comprises reacting 2-tetrahydrofuran-undecanoic acid or an ester thereof with acetic acid anhydride in the presence of metal halide, such as zinc chloride, etc., converting the resulting ω-acetyloxypentadecenoic acid into ω-acetylpentadecanoic acid by a hydrogenation reaction, and thereafter saponifying it to produce ω-oxypentadecanoic acid. Further, in this Japanese Patent Publication No. 4262/68, a ring-cleavage reaction of the tetrahydrofuran ring by hydrogen bromide has been described. Both of these ring-cleavage processes require three steps in order to derive ω-oxypentadecanoic acid from 2-tetrahydrofuran-undecanoic acid or an ester thereof. In addition, materials composing the apparatus are restricted due to the use of a high temperature of 200° C. under high pressure using zinc chloride, acetic acid anhydride, and hydrogen bromide, such that expensive materials such as titanium, Monel metal, etc., are required for the apparatus.

In addition to the above-described processes, there is a process which comprises carrying out cleavage of aliphatic straight-chain-or cyclic ether bond using hydrogen iodide or magnesium bromide at ordinary temperature under atmospheric pressure (C. A. Smith et al., *J. Org. Chem.,* Vol. 41, 367 (1976) and D. J. Goldsmith et al., *J. Org. Chem.,* Vol. 40, 3571 (1975)). However, in this process, three or more steps are required for deriving ω-oxypentadecanoic acid, likewise the process described in Japanese Patent Publication No. 4262/68, and, in addition, expensive hydrogen iodide and magnesium bromide are required in at least a stoichiometric amount.

On the other hand, as a process for catalytic ring-cleavage of the tetrahydrofuran ring, it has been known that the ring cleavage reaction takes place at 400° C. in the presence of a Pd-C catalyst. In this case, however, products having a hydroxyl group on ω-position are not produced (*Izv. Akad. Nauk., SSSR, Ser. Khim.,* 1965 (1), p. 165, *Chem. Abstracts,* Vol. 62, 11679 (1965)). Further, there is a report that products having a hydroxyl group on the ω-position are obtained (yield 40 mol%) by ring-cleavage of 2-propyltetrahydrofuran in the presence of an Ni-Al alloy catalyst at 275° C. under 1 atmospheric hydrogen pressure, but products having a hyroxyl group at the ω-position are not obtained in the presence of the same catalyst at 250° C. under 50 atmospheric hydrogen pressure (N. I. Shuikin et al., *Acta. Chim. Hung. Tomus,* Vol. 38, p. 115 (1963)).

3

As described above, the manner of cleavage changes according to the kind of catalyst and the condition of hydrogenolysis, and the yield and selectivity are not completely satisfactory. Thus, an industrially useful catalytic hydrogenolysis reaction has not yet been found.

SUMMARY OF THE INVENTION

As a result of extensive studies of catalysts and reaction conditions for selective hydrogenolysis of 2-tetrahydrofuran-undecanoic acid or an ester thereof to form ω-oxypentadecanoic acid, it has now been found that a mixed catalyst composed of a solid acid catalyst having a controlled acidity and a catalyst for hydrogenation that causes selective cleavage of the bond between the substituted carbon atom and the oxygen atom in the tetrahydrofuran ring of 2-tetrahydrofuran-undecanoic acid or an ester thereof and the consecutive hyrogenation producing ω-oxypentadecanoic acid in a good yield, and that this catalyst system accelerates intermolecular esterification between the hydroxyl group and the carboxyl group to cause the polycondensation reaction, by which polyesters advantageous for producing cyclopentadecanolide by depolymerization is formed.

Thus, the present invention provides a process for producing polycondensates of ω-oxypentadecanoic acid which comprises hyrogenolysis of 2-tetrahydrofuran-undecanoic acid or an ester thereof in the presence of a mixed catalyst composed of a catalyst for hydrogenation comprising one or more metals of Group VIII in the Periodic Table, copper-chromium, or copper-zinc, and a solid acid catalyst, by heating under pressure with hydrogen.

DETAILED DESCRIPTION OF THE INVENTION

The reaction of the process of the present invention is represented by the following formulae.

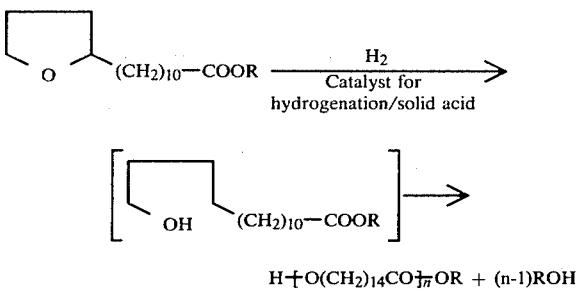

$H \text{-}\!\!+\!\!\text{O}(CH_2)_{14}CO\text{-}\!\!\!]_{\overline{n}}OR + (n-1)ROH$ wherein R represents a hydrogen or a lower alkyl group, and n is an integer of from 2 to 12, and the term in the brackets means a non-isolated intermediate.

In the present invention, 2-tetrahydrofuran-undecanoic acid or an ester thereof can be easily obtained from tetrahydrofuran and undecylenoic acid prepared by thermal decomposition of castor oil by a known process. This process also can be applicable for esters such as methyl, ethyl, or propyl ester of 2-tetrahydrofuran-undecanoic acid. The reaction of the present invention easily causes hydrogenolysis of these esters to form ω-oxypentadecanoic acid esters and causes the subsequent formation of polycondensates, eliminating corresponding methyl, ethyl or propyl alcohol. Therefore, these esters can be used as the starting material in a similar manner to 2-tetrahydrofuran-undecanoic acid.

The catalyst for hydrogenation used in the present invention is prepared using metals of Group VIII of the Periodic Table, namely, Pd, Pt, Rh, Os, Ni, Fe and Co, copper-chromium, or copper-zinc as the principal component. Metal oxides, Raney catalysts, supported catalysts on various kinds of carriers as well as other commercially available catalyst (refer to examples hereafter) can be used as the catalyst. Solid acids used as the solid acid catalyst of the present invention can be used as the carrier when the acidity of the solid acid described below is preserved so that the acid sites kept unoccupied on the surface of the supported catalysts participate the hydrogenolysis reaction as well as the sites capable of hydrogenation. Thus, in this case the catalyst for hydrogenation and the solid acid catalyst can be used in the form of a unified body.

Although the amount of the catalyst for hydrogenation used is not particularly restricted, it is preferred to use it in an amount of from 1 to 20% by weight based on the weight of 2-tetrahydrofuran-undecanoic acid or ester thereof.

As the solid acid of the solid acid catalyst used in the present invention, those which change the color of Hammett's indicators (K. Tanabe, *Solid Acid and Bases,* Kodansha, Tokyo, Academic Press, New York, London, 1970) for the range of pKa of from +3.3 to −3.0 into the color of acidic state are preferred. Namely, such solid acids are those the indicator adsorbed on the surface of which shows the color of its acidic state when one or two drops of a 1 wt% solution of dicinnamalacetone (pKa=−3.0) or butter yellow (pKa=+3.3) in benzene are added to a suspension of 1 g of the solid acid in benzene. These solid acids include natural clays such as activated clay, kaolin, or acid clay, silica-alumina, alumina, and acid zeolite. Besides, solid acids prepared by impregnating activated clay, silica gel, or alumina with sulfuric acid, phosphoric acid, or boric acid, and calcining at a temperature of from 150° C. to 250° C. so as not to dissolve the impregnated acid in the reacting solution can be used, too. However, inorganic acids such as sulfuric acid or phosphoric acid, etc., organic acids such as methanesulfonic acid or p-toluenesulfonic acid, and resins having sulfonic acid groups such as strongly acid cation-exchange resin having sulfonic acid groups are not preferred to be combined directly with the catalyst for hydrogenation, because not only do they easily cause catalyst poison with respect to the hydrogenating activity of the catalyst for hydrogenation, but they also sometimes corrode the materials of the apparatus.

The mixing ratio of the catalyst for hydrogenation to the solid acid catalyst depends upon the kind of catalyst for hydrogenation, the acid strength and the number of acid sites (an acid site has an ability to convert an adsorbed base into its conjugate acid, T. Yamanaka and K. Tanabe, *J. Phys. Chem., Vol.* 79, 2409 (1975)) on the surface of the solid acid, and the temperature for hydrogenolysis. However, it is preferred to establish a catalyst ratio of from 1.0 to 0.05 by weight (value obtained by dividing the amount of the catalyst for hydrogenation by the amount of the solid acid catalyst). Generally, it is preferred for the solid acid catalyst having weak acidity which changes the color of the indicator of pKa of from 3.0 to 1.5 into an acidity color to be used in a catalyst ratio of from 0.3 to 0.05, at the temperature of hydrogenolysis of from 150° C. to 200° C. The mixing ratio of the solid acid is selected on the basis of the reactivity and selectivity with respect to ω-oxypentadecanoic acid. Too strong acidity of the solid acid or too many acid sites on its surface tend to increase the amount of by-products, for example, hydrogenated pentadecanoic acid formed after elimination of the hydroxyl group on the ω-position as water or ω-alkoxypentadecanoic acid formed by intermolecular dehydration with formed alcohol.

The catalyst for hydrogenation and the solid acid catalyst can be placed separately in the reactor, respectively, to be mixed together with the substrate before the hydrogenolysis reaction. They also can be premixed prior to be placed in the reactor. The same result is obtained in both cases by the reaction of the present invention. In the absence of the solid acid catalyst at a reacting temperature of from 100° C. to 250° C., the hydrogenolysis hardly takes place. Although, the catalytic action of the solid acid catalyst during the hydrogenolysis reaction is not explicit.

In the present invention, the solid acid appears to promote the cleavage of the tetrahydrofuran ring of 2-tetrahydrofuran-undecanoic acid or an ester thereof, and the ω-oxypentadecanoic acid formed by hydrogenation consecutive to the cleavage is then condensed by the catalytic action of the solid acid catalyst to form polyester (referred to herein as "polycondensation").

In the present invention, the hydrogen pressure is generally from 1 to 100 atmospheric pressures, and, preferably from 1 to 35 atmospheric pressures. The reacting temperature is generally from 100° C. to 250° C., and preferably from 140° C. to 190° C.

While the hydrogenolysis reaction proceeds in the present invention, the resulting ω-oxypentadecanoic acid or an ester thereof is consecutively polycondensed by eliminating water or alcohol to produce the polyester. In some cases, the amount of water or alcohol increased with the formation of polyester reduces the partial pressure of hydrogen and at the same time weakens the acidity of the solid acid to retard the hydrogenolysis. In such cases, water or alcohol formed is removed from the reactor together with the hydrogen gas, and the hydrogenolysis reaction is continued by replacing the gas phase in the reactor with fresh hydrogen and adding a fresh mixed catalyst composed of the catalyst for hydrogenation and the solid acid catalyst or adding a fresh solid acid catalyst to the reactor, by which the reaction can be completed. Hydrogen just enough to supply its consumption in the hydrogenolysis reactor is added throughout the reaction. When the consumption of hydrogen is hardly observed by stopping the introduction of fresh hydrogen, the hydrogenolysis reaction is taken as completed. The required reaction time is generally from about 2 to 10 hours. After conclusion of the reaction, the reaction product is dissolved in an organic solvent such as toluene. After the catalyst is removed, the organic solvent is removed by distillation to obtain the objective product. The catalyst using noble metals is recovered by a conventional process and is reused after regeneration.

When the reaction product obtained by the present invention is subjected to instrumental analysis, it is ascertained to be a polyester mainly from ω-oxypentadecanoic acid or an ester thereof, which is condensed by the intermolecular elimination of water or alcohol between the hydroxyl group and the carboxyl group or the alkoxylcarboxyl group, respectively. This product is a linear polyester having a carboxyl group on one end of the molecule which has an interactive structure of a head to tail bonding. Accordingly, the average molecular weight and the average degree of polymerization after the hydrogenolysis of 2-tetrahydrofuran-undecanoic acid can be determined by measuring the acid value of the polyester. The polycondensate of ω-oxypentadecanoic acid obtained by the present invention has an acid value in the range of from 120 to 20, which means an average molecular weight of from 470 to 2,800 and an average degree of polymerization of from 2 to 12. The reason why the polyester formed has a comparatively low molecular weight is believed to be that by-produced pentadecanoic acid or ω-alkoxypentadecanoic acid or unreacting 2-tetrahydrofuran-undecanoic acid, etc., bonds to the ends of the polymer, thereby terminating the polymer chain.

The polycondensates of ω-oxypentadecanoic acid obtained as described above are subjected to depolymerization by a conventional method, for example, by heating under reduced pressure, easily to be derived to cyclopentadecanolide.

The present invention overcomes the deficiencies of the prior known processes, namely, the requirement of a large number of steps, unsatisfactory yields, the necessity of a plan for preventing corrosion of the apparatus, expensive starting materials required to be used, etc. Furthermore, according to the present invention, intermediates of cyclopentadecanolide, namely, polycondensates of ω-oxypentadecanoic acid, can be produced in only one step by using easily available 2-tetrahydrofuran-undecanoic acid or an ester thereof as the starting material. This compares favorably with the prior processes for producing cyclopentadecanolide, which comprise first producing ω-oxypentadecanoic acid, then polymerizing it, and depolymerizing it thereafter. Accordingly, the present invention is of great industrial value for the production of cyclopentadecanolide, which is a high-grade synthetic perfume.

Below, the present invention will be illustrated in greater detail by reference to examples.

EXAMPLE 1

A 100 ml autoclave made of stainless steel SUS-27 was charged with 4 g of 2-tetrahydroundecanoic acid, 0.8 g of a solid acid catalyst which was produced by impregnating natural activated clay with aqueous sulfuric acid in an amount corresponding to 2% by weight of sulfuric acid and calcining at 200° C., in the air, and 0.4 g of stabilized nickel catalyst produced by Nikki Chemicals Co., Ltd. (Ni 44–48%, Cr 2–3%, Cu 2–3%, diatomaceous earth 25–27%, graphite 4–5%; state of Ni: Ni+NiO), and hydrogen was introduced thereto under pressure with stirring and heating. Hydrogen began to be absorbed at once. While keeping the temperature at 150° C. and the hydrogen pressure at 30 kg/cm$^2$, introduction of hydrogen under pressure was continued. After 8 hours, the absorption of hydrogen stopped and the reaction was finished.

Then, the autoclave was cooled. After the hydrogen gas was discharged, 20 ml of toluene was added to the autoclave and the reaction product was heated to 80° C. The reaction product was withdrawn as a solution in toluene, and the catalyst was separated by filtration. Toluene was removed by distillation to produce 3.8 g of a white waxy product as a residue.

According to infrared spectrophotometry, this product had an absorption of 1730 cm$^{-1}$ (Nujol) which was assigned to the ester bond, and it had an acid value of 45.4. This value meant an average molecular weight of 1,233 and an average degree of polymerization of 5.14.

Further, in order to ascertain the composition of this polycondensate and clarify the extent of reaction, the polycondensate was saponified and esterified with diazomethane and the resulted products were subjected to instrumental analysis to carry out identification and quantitative analysis. Thus, a conversion was determined as the mol% based on the starting molar amount of 2-tetrahydrofuran-undecanoic acid and the selectivity was defined as the percent molar ratio of the ω-oxypentadecanoic acid produced to the total amount of 2-tetrahydrofuran-undecanoic acid consumed. More particularly, 3 ml of 20 wt% KOH in ethanol was added to 1 g of the polycondensate obtained as described above. After being saponified for 6 hours by refluxing, 13 ml of water and 10 ml of ethyl ether were added to the mixture, and the aqueous phase was acidified by adding 20 wt% aqueous sulfuric acid to cause migration of acid substances into the ether phase. The ether phase was then separated and condensed to obtain 1.1 g of the residue. The acid product was converted into a methyl ester by diazomethane. The reaction mixture was subjected to gas chromatography using an internal standard method, it had a composition consisting of 86.0 mol% methyl ω-oxypentadecanoate, 2.6 mol% methyl 2-tetrahydrofuran-undecanoate, 2.4 mol% methyl pentadecanoate and unknown materials. By means of gas chromatography and mass spectrometry of the reaction mixture, retention times and mass spectra of methyl 2-tetrahydrofuran-undecanoate, methyl pentadecanoate, and methyl ω-oxypentadecanoate completely agreed respectively, with those of the corresponding authentic samples. From the above-described results of analyses, the conversion and the selectivity of ω-oxypentadecanoic acid were calculated as 97.4 mol% and 88.3 mol%, respectively.

COMPARATIVE EXAMPLE

For comparison, the same procedure as that described above was carried out, except that 0.02 g of 95% sulfuric acid was used instead of activated clay as the solid acid catalyst. Thus, 4.1 g of white waxy material was obtained. This material was subjected to the same saponification treatment as in Example 1 and was converted into methyl ester by diazomethane. As a result of analysis, the conversion was only 4.0 mol% and the selectivity to ω-oxypentadecanoic acid was only 47.6%.

EXAMPLES 2-7

In Examples 2 to 7, the same procedure as in Example 1 was carried out using the same activated clay as the solid acid catalyst used in Example 1 under reacting conditions described in the following Table 1, except that the ratio of the catalyst for hydrogenation to the solid acid catalyst was varied and a Pd-C catalyst (5% Pd carbon powder (high activity) produced by Nippon Engelhart Co.), a copper-zinc catalyst (N211, produced by Nikki Chemicals Co., Ltd.), a Raney Ni catalyst (Developed Raney nickel catalyst, produced by Kawaken Fine Chemical Co.), and a copper-chromium catalyst N203, produced by Nikki Chemicals Co., Ltd.) were used as catalyst for hydrogenation. Results are shown in Table 1. In Table 1, the catalyst weight ratio is a value obtained by dividing the amount of the catalyst for hydrogenation by the amount of solid acid catalyst. The conversion and the selectivity values were calculated from analysis of the reaction mixture, which is obtained by treating with diazomethane after saponification of the polycondensate.

TABLE 1

| | Catalyst | | | Reaction Conditions | | | Results of Reaction | | |
|---|---|---|---|---|---|---|---|---|---|
| | Catalyst for Hydrogenation | Solid Acid Catalyst | Weight Ratio | Temperature (°C.) | Time (hrs) | Hydrogen Pressure (kg/cm$^2$) | Yield of Polycondensate (g) | Conversion (mol %) | Selectivity (mol %) |
| Example 2 | Stabilized nickel | Activated clay in Example 1 | 1.0 | 150 | 8 | 30 | 3.8 | 96.4 | 71.1 |
| Example 3 | Stabilized nickel | Activated clay in Example 1 | 0.3 | 165 | 8 | 30–32 | 3.8 | 99.3 | 81.9 |
| Example 4 | 5% Pd-C | Activated clay in Example 1 | 1.0 | 150 | 8 | 30 | 3.7 | 88.6 | 54.2 |
| Example 5 | Copper-zinc | Activated clay in Example 1 | 1.0 | 150 | 8 | 30 | 3.8 | 70.0 | 45.9 |
| Example 6 | Raney Ni | Activated clay in Example 1 | 1.25 | 150 | 8 | 30–32 | 3.8 | 78.9 | 67.9 |
| Example 7 | Copper-chromium | Activated clay in Example 1 | 1.0 | 150 | 8 | 30 | 3.7 | 85.0 | 56.8 |

EXAMPLE 8

A catalyst composed of a combination of a catalyst for hydrogenation and a solid acid catalyst was prepared by supporting nickel sulfate (the catalyst for hydrogenation) on silica-alumina (the solid acid catalyst) having an acidity of changing the color in pKa = −3.0 into an acidity color, and calcining it at 300° C. in the air. The catalyst weight ratio of the nickel sulfate (calculated as nickel metal) to the silica-alumina was 0.05:1. Using this catalyst, 3.9 g of a polycondensate of ω-oxypentadecanoic acid was obtained from 4.0 g of 2-tetrahydrofuran-undecanoic acid by the same manner as in Example 1. As a result of analysis, the conversion was determined to be 55.3 mol% and the selectivity to ω-oxypentadecanoic acid was 64.9 mol%.

EXAMPLES 9-11

Polycondensates of ω-oxypentadecanoic acid were produced using 4.0 g of methyl 2-tetrahydrofuran-undecanoate as the starting material, 0.4 g of a catalyst for hydrogenation and a corresponding catalyst weight ratio of a solid acid catalyst, by the same procedure as in Example 1. Namely, in Examples 9 to 11, the same procedure as that described in Example 1 was carried out under the reacting conditions described in the following Table 2, using the same stabilized nickel as described in Example 1, as the catalyst for hydrogenation, and using activated clay as used in Example 1 (which is represented as activated clay-1 in Table 2), activated clay prepared by merely drying natural activated clay at 200° C., which had strong acidity, changing the color of the indicator at pKa= −3.0 into an acidity color and had 3.82 millimols/g of acid sites of pKa less than 7.1 (which is represented as activated clay-2 in Table 2) and acid clay having acidity of changing the color of the indicator of pKa=1.5 into an acidic color (which is represented as acid clay in Table 2). The results are shown in Table 2.

the selectivity to $\omega$-oxypentadecanoic acid was 89.4 mol%.

EXAMPLE 13

250 g of 2-tetrahydrofuran-undecanoic acid, 15 g of activated clay, and 3.75 g of stabilized nickel were placed in an autoclave. After carrying out the reaction for 2 hours by the same procedure as in Example 12, 10 g of fresh activated clay and 2.5 g of fresh stabilized nickel were additionally added to continue the hydrogenolysis for additional three hours. After conclusion of the reaction, the autoclave was cooled and the hydrogen gas was discharged. After 500 ml of toluene was added and stirred, the catalyst was removed by filtration and toluene was then removed by distillation, to obtain 235 g of a polycondensate of $\omega$-oxypentadecanoic acid. It had an acid value of 45.2, an average

TABLE 2

|  | Catalyst | | Reaction Conditions | | | Results of Reaction | | |
|---|---|---|---|---|---|---|---|---|
|  | Catalyst for Hydrogenation | Solid Acid Catalyst | Weight Ratio | Temperature (°C.) | Time (hrs) | Hydrogen Pressure (kg/cm$^2$) | Yield of Polycondensate (g) | Conversion (mol %) | Selectivity (mol %) |
| Example 9 | Stabilized nickel | Activated clay-1 | 0.3 | 140 | 2 | 25 | 3.6 | 80.4 | 56.6 |
| Example 10 | Stabilized nickel | Activated clay-2 | 0.3 | 170 | 4 | 25 | 3.6 | 83.9 | 70.5 |
| Example 11 | Stabilized nickel | Acid clay | 0.5 | 160 | 8 | 25 | 3.7 | 59.2 | 62.0 |

EXAMPLE 12

25 g of 2-tetrahydroundecanoic acid, 1.5 g of the same activated clay as in Example 1, and 0.375 g of stabilized nickel were placed in an autoclave with electromagnetic stirrer. After hydrogen was introduced so as to have an initial hydrogen pressure of 25 kg/cm$^2$, the mixture was heated to 170° C. After 15 minutes, 30 minutes, and 60 minutes from the beginning of absorption of hydrogen, the internal pressure of the autoclave was reduced three times to the atmospheric pressure, in order to discharge hydrogen and water generated, and fresh hydrogen was introduced each time till the pressure became 30 kg/cm$^2$. Thereafter the reaction was continued at 170° C. for 2 hours.

The autoclave was then cooled, and 1.0 g of fresh activated clay and 0.25 g of fresh stabilized nickel were additionally added to the reaction system. After hydrogen was introduced so as to obtain a hydrogen pressure of 25 kg/cm$^2$, the mixture was heated to 170° C. with stirring. After 20 minutes and 40 minutes, the hydrogen was substituted twice by fresh hydrogen in the same manner as described above, and the reaction was carried out at 170° C. with stirring for an additional 2 hours.

The autoclave was then cooled. After the hydrogen gas was discharged, 50 ml of toluene was added and the mixture was heated to 80° C. The solution of the product in toluene was filtered to separate the catalyst. Toluene in the filtrate was removed by distillation to obtain 24.2 g of a white waxy reaction product.

As a result of infrared spectrophotometry, it was ascertained that this product was a polyester. Then, saponification and ether extraction were carried out in the same manner as in Example 1, to obtain 26.7 g of crude $\omega$-oxypentadecanoic acid containing ether.

As a result of gas chromatography after methylation with diazomethane, the conversion was 98.4 mol% and molecular weight of 1,239, and an average degree of polymerization of 5.16.

Then, this polycondensate was put in a 500 ml Claisen flask. After being heated to 200° C. for 2 hours by a mantol heater under a reduced pressure of 10 mm Hg, the temperature was elevated to 250° C. to carry out depolymerization and the distillate was collected. Further, the temperature was gradually elevated up to 350° C. to obtain the distillate. 137 g of the distillate was placed in a 300 ml flask equipped with a 20 cm Widmer spiral, and fractional distillation was carried out to obtain 112 g of a fraction having a boiling point of 122°–123° C./1 mm Hg.

As a result of gas chromatography analyzer, this fraction was found to contain 94.0% of cyclopentadecanolide. The product was recrystallized using ethanol as a solvent to obtain 78 g of white solid having a melting point of 36°–37° C. Fragrance, infrared spectra, and mass spectra of this product agreed with those of the authentic sample of cyclopentadecanolide.

While the invention has been described in detail and with reference to specific embodiments thereof, it will be apparent to one skilled in the art that various changes and modifications can be made therein without departing from the spirit and scope thereof.

What is claimed is:

1. A process for producing polycondensates of $\omega$-oxypentadecanoic acid comprising hydrogenolysis of 2-tetrahydrofuran-undecanoic acid or an ester thereof using a mixed catalyst composed of a catalyst for hydrogenation comprising one or more metals of Group VIII of the Periodic Table, copper-chromium, or copper-zinc, and a solid acid catalyst, by heating under pressure with hydrogen.

2. A process for producing polycondensates of $\omega$-oxypentadecanoic acid according to claim 1, wherein the heating temperature is from 100° C. to 250° C.

3. A process for producing polycondensates of ω-oxypentadecanoic acid according to claim 1, wherein the heating temperature is from 140° C. to 190° C.

4. A process for producing polycondensates of ω-oxypentadecanoic acid according to claim 1, 2, or 3, wherein the partial pressure of hydrogen is from 1 to 100 atmospheres.

5. A process for producing polycondensates of ω-oxypentadecanoic acid according to claim 1, 2, or 3, wherein the partial pressure or hydrogen is from 1 to 35 atmospheres.

6. A process for producing polycondensates of ω-oxypentadecanoic acid according to claim 1, 2, or 3, wherein the reaction is carried out for a period of from 2 to 10 hours.

7. A process for producing polycondensates of ω-oxypentadecanoic acid according to claim 4, wherein the reaction is carried out for a period of from 2 to 10 hours.

8. A process for producing polycondensates of ω-oxypentadecanoic acid according to claim 5, wherein the reaction is carried out for a period of from 2 to 10 hours.

9. A process for producing polycondensates of ω-oxypentadecanoic acid according to claim 1, 2, or 3, wherein the solid acid catalyst changes the color of a Hammett indicator for the range of pKa of from $+3.3$ to $-3.0$ into the acidic color state thereof.

10. A process for producing polycondensates of ω-oxypentadecanoic acid according to claim 9, wherein the solid acid catalyst is selected from the group consisting of natural clays; silica-alumina; alumina; acid zeolite; and activated clay, silica gel, or alumina impregnated with sulfuric acid, phosphoric acid, or boric acid.

* * * * *